Aug. 30, 1966     G. G. COCKS     3,269,264
APPARATUS FOR EXHIBITING COUPLING-THREAD CONTOUR
Filed May 28, 1964     9 Sheets-Sheet 1
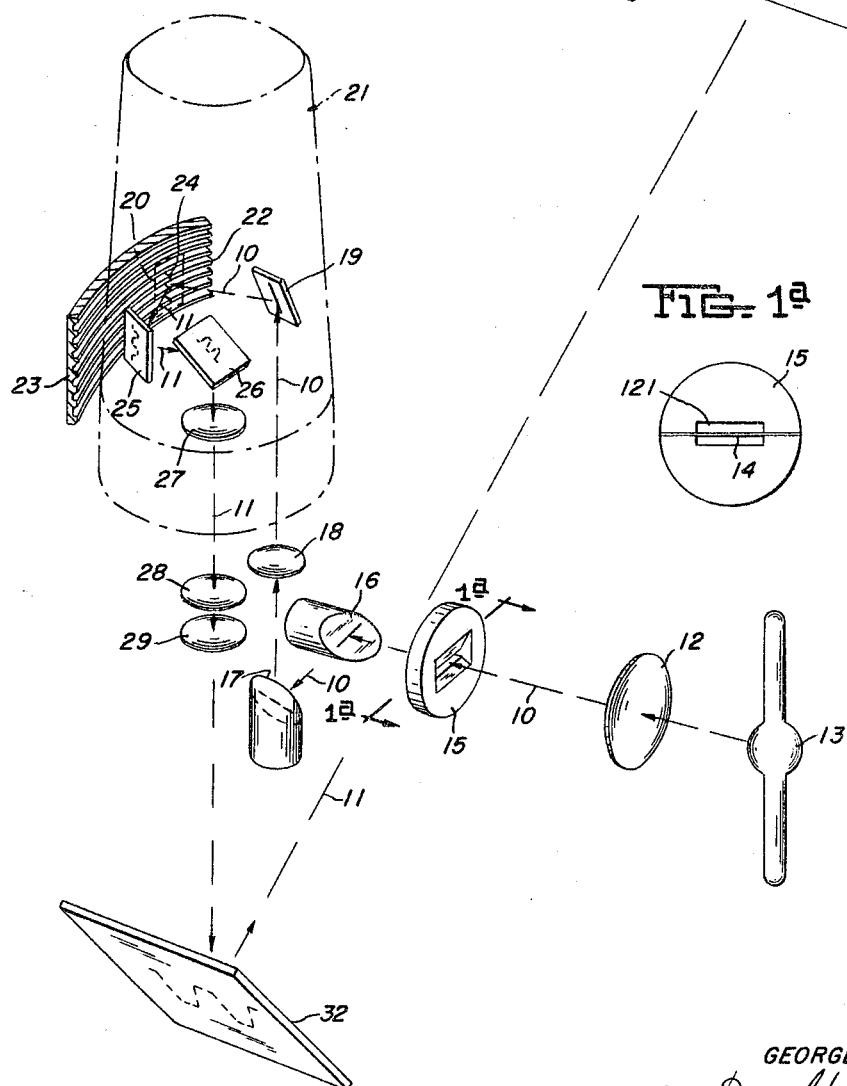
INVENTOR
GEORGE G. COCKS
By Donald G. Dalton
Attorney Aug. 30, 1966  G. G. COCKS  3,269,264
APPARATUS FOR EXHIBITING COUPLING-THREAD CONTOUR
Filed May 28, 1964  9 Sheets-Sheet 2
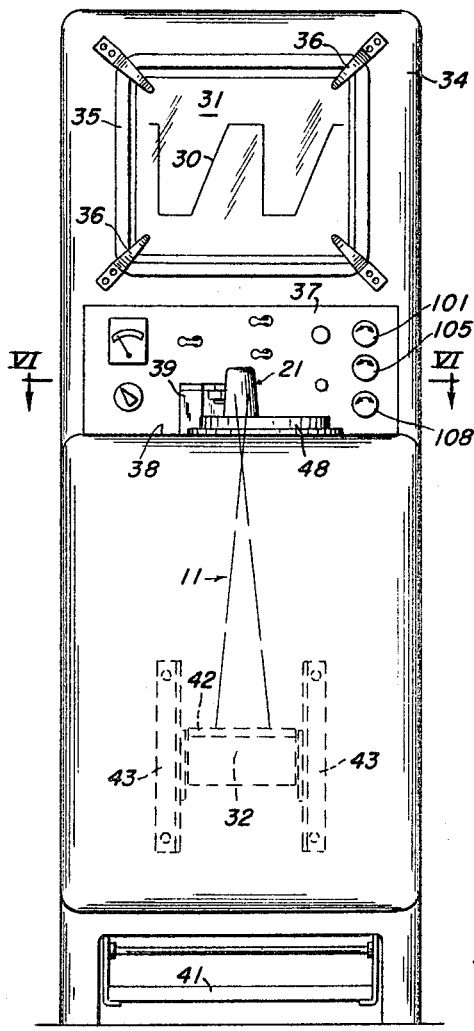
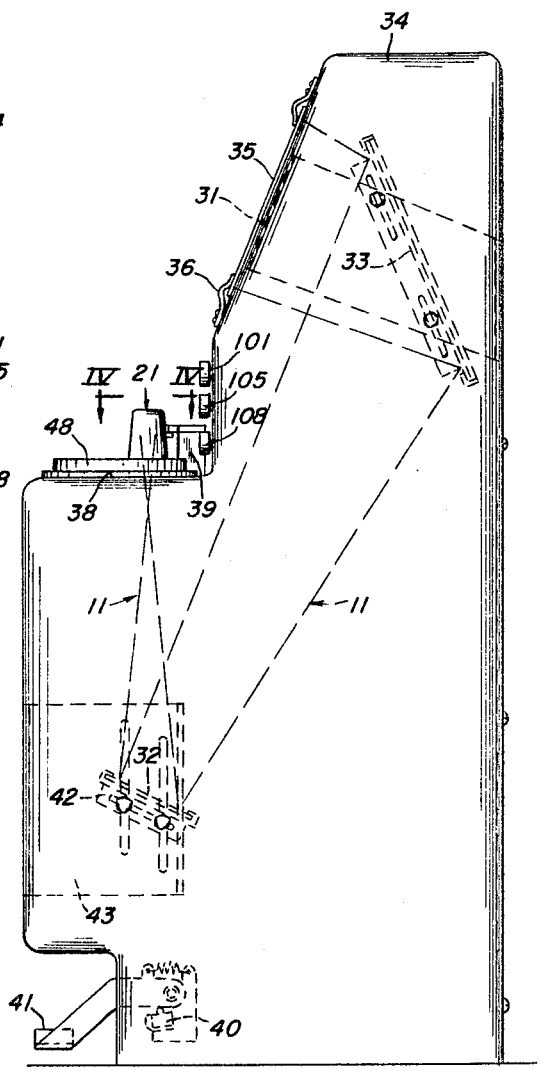
INVENTOR
GEORGE G. COCKS
By Donald G. Dalton
Attorney Aug. 30, 1966  G. G. COCKS  3,269,264
APPARATUS FOR EXHIBITING COUPLING-THREAD CONTOUR
Filed May 28, 1964  9 Sheets-Sheet 3

INVENTOR
GEORGE G. COCKS
By Donald G. Dalton
Attorney

Aug. 30, 1966 G. G. COCKS 3,269,264
APPARATUS FOR EXHIBITING COUPLING-THREAD CONTOUR
Filed May 28, 1964 9 Sheets-Sheet 4
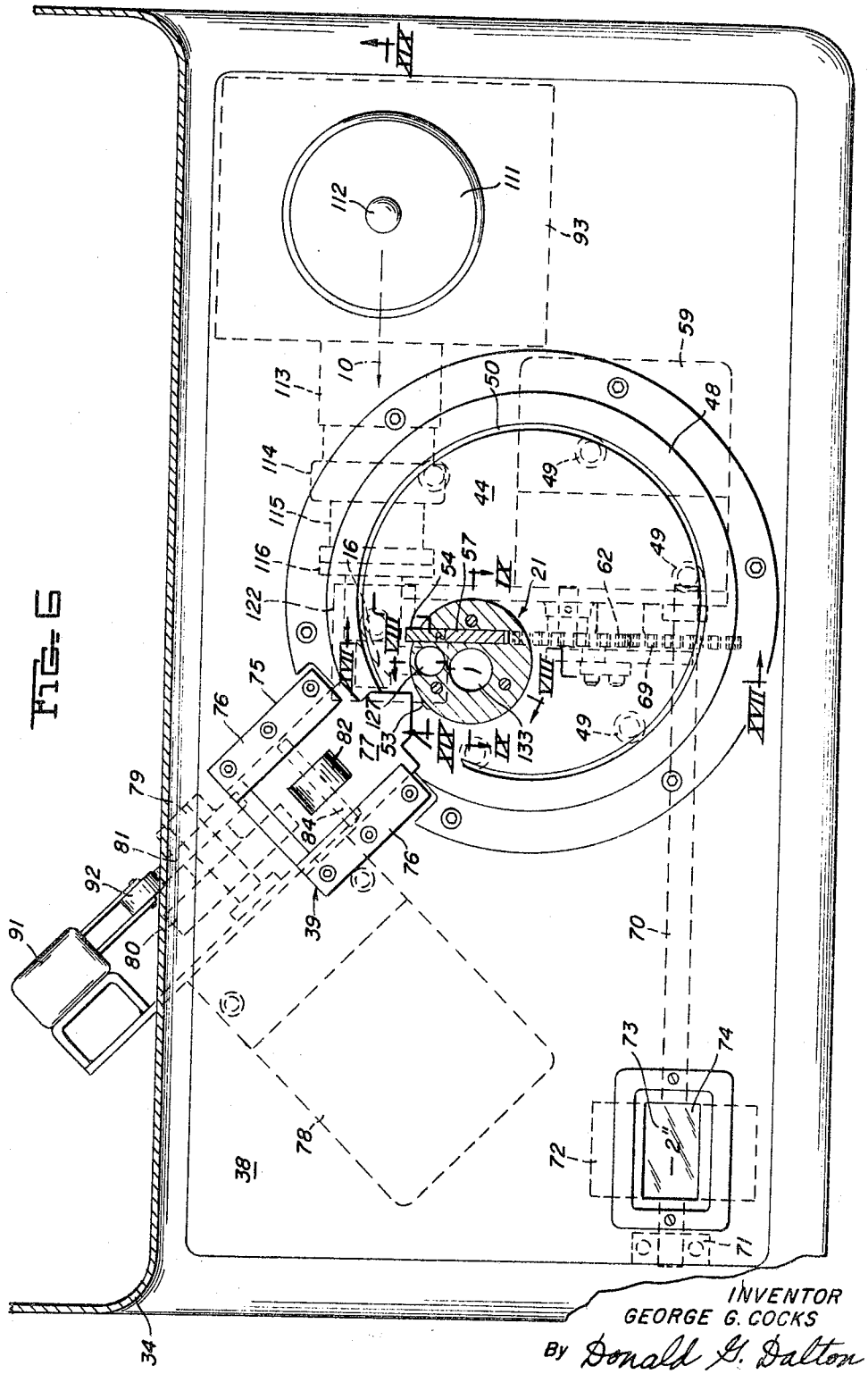
INVENTOR
GEORGE G. COCKS
By Donald G. Dalton
Attorney

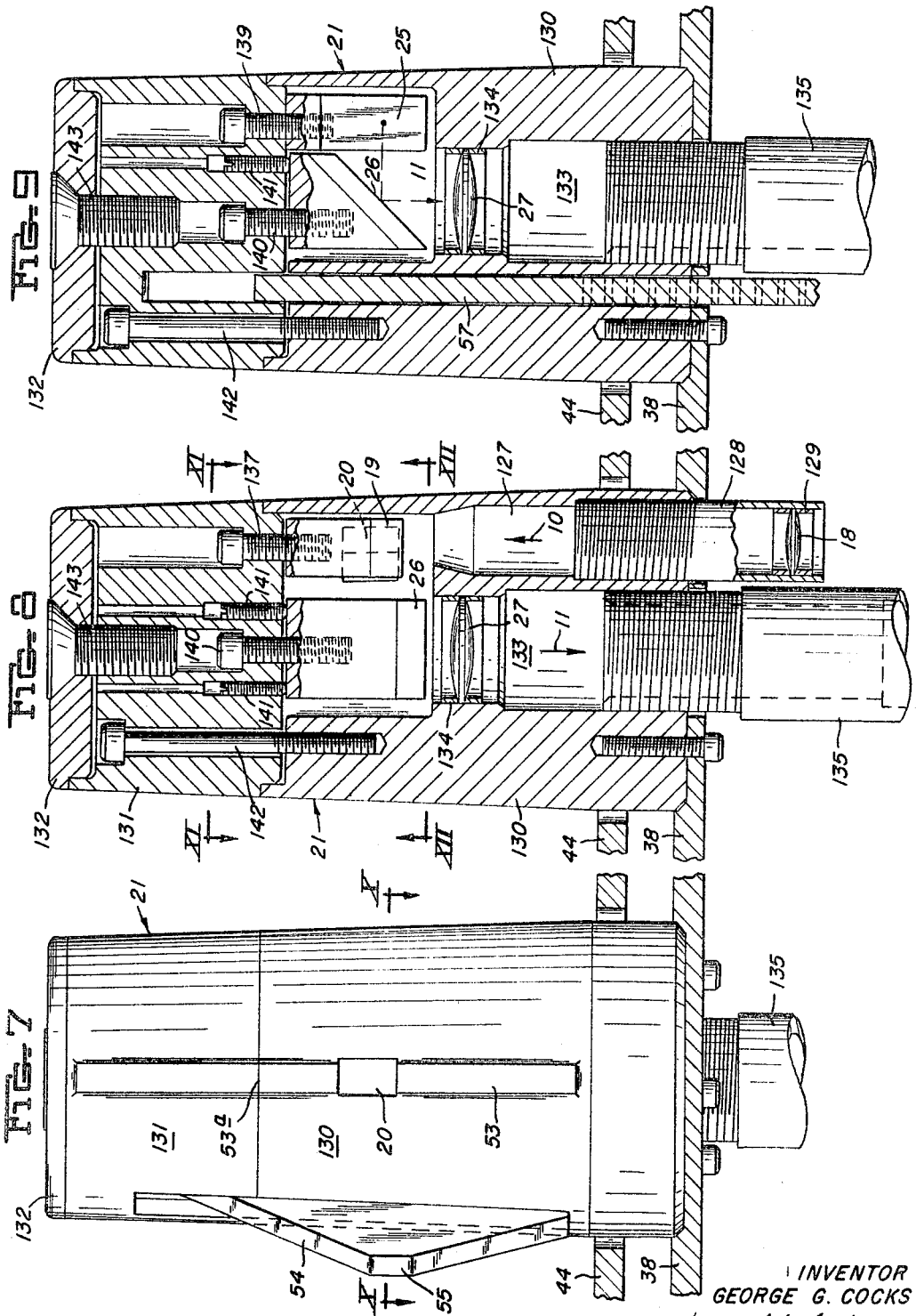

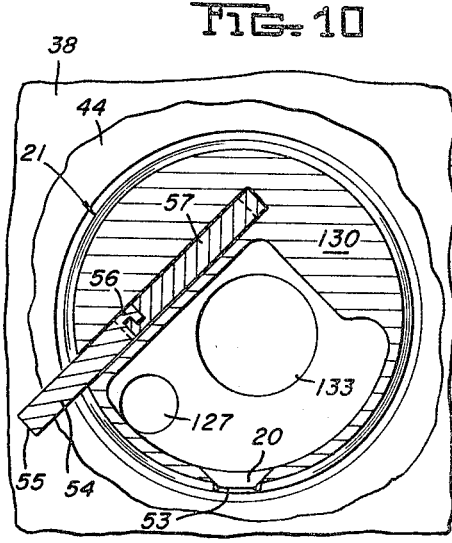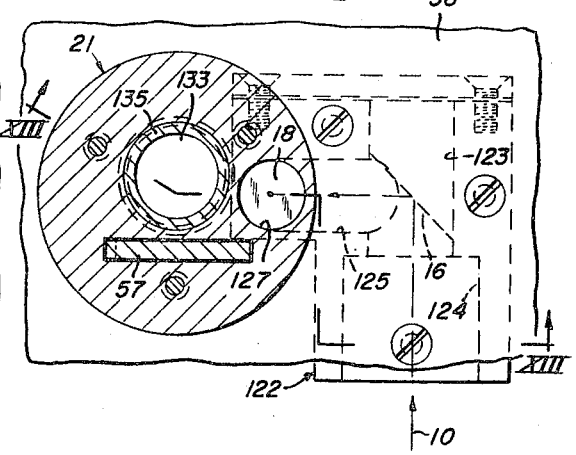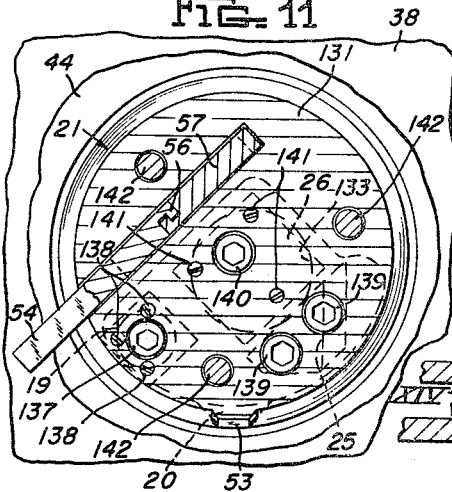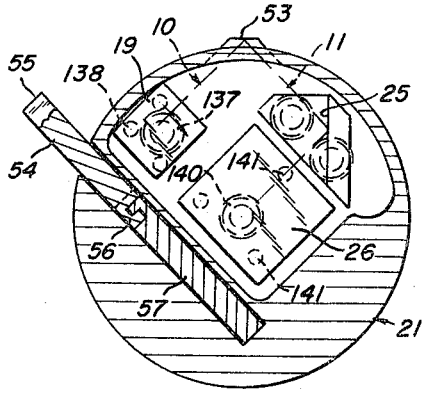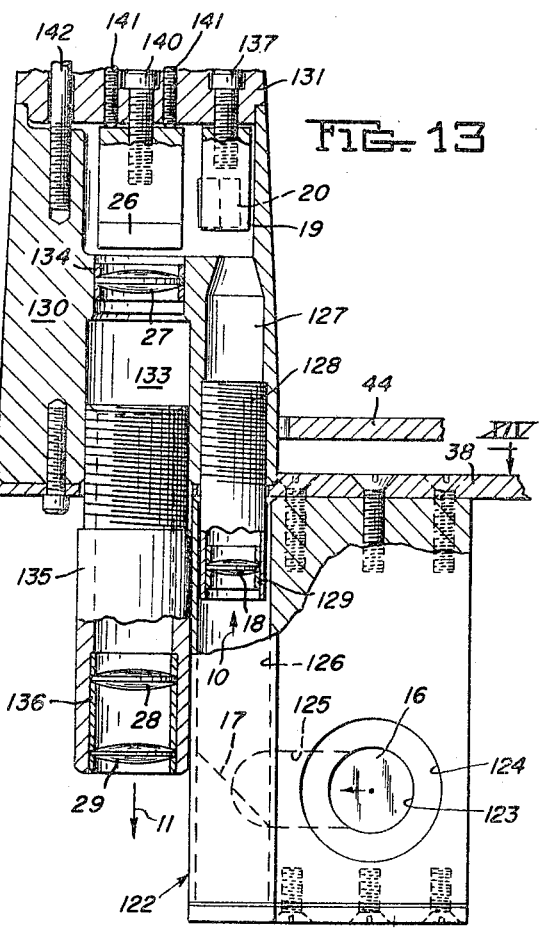

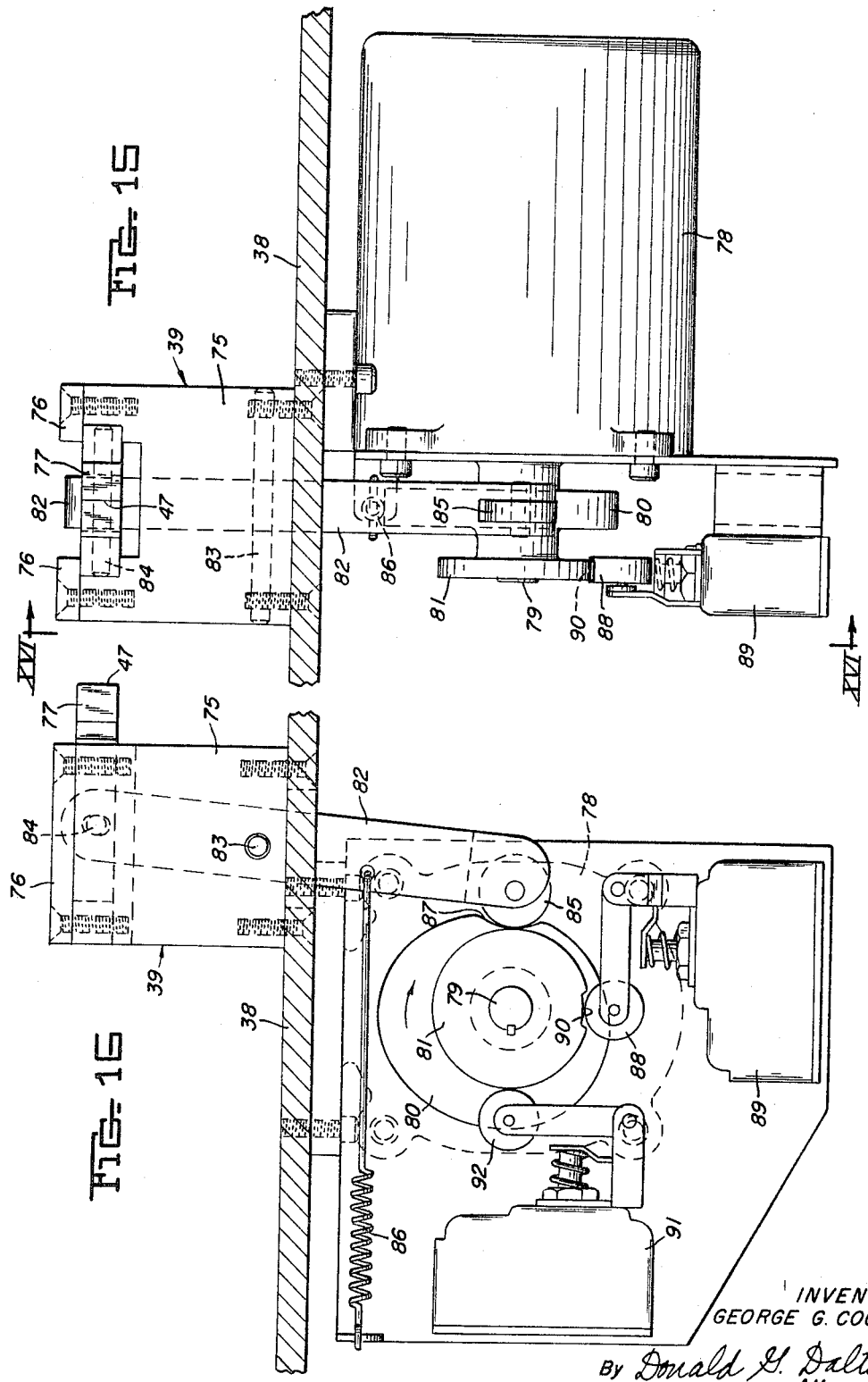

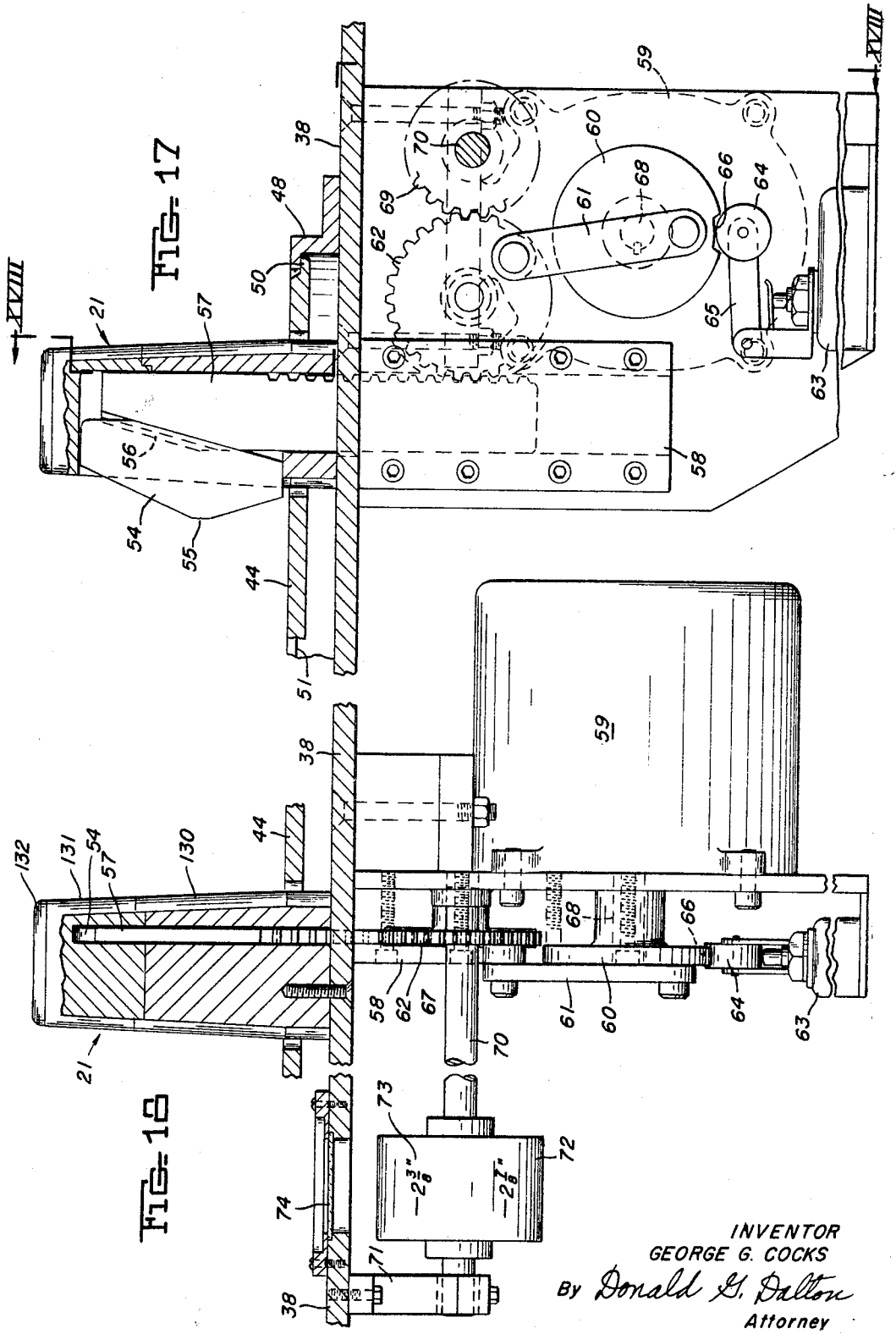

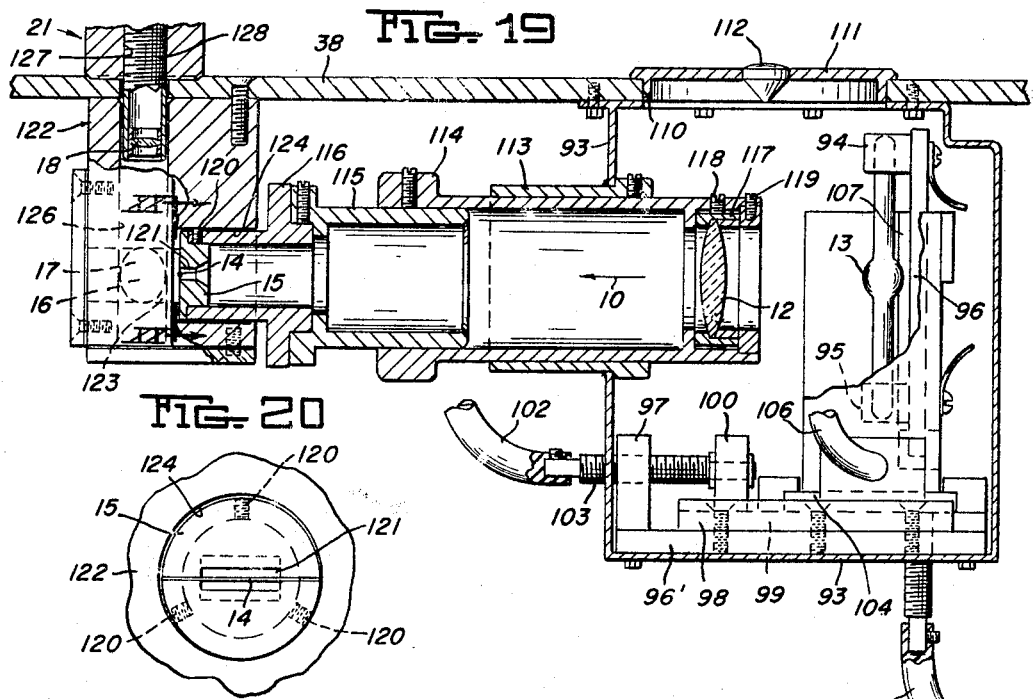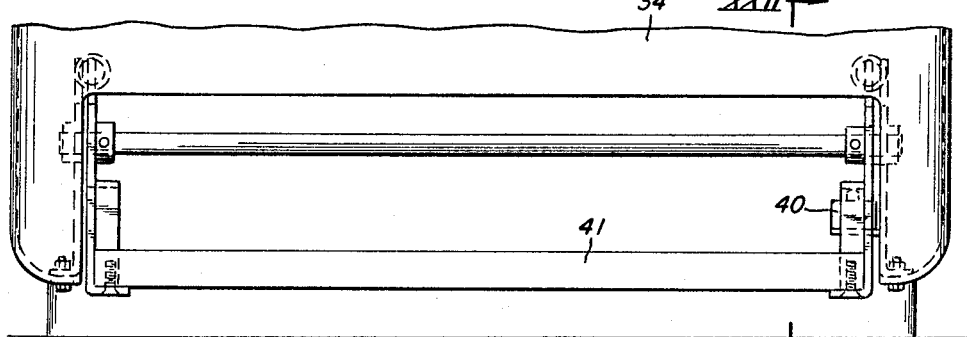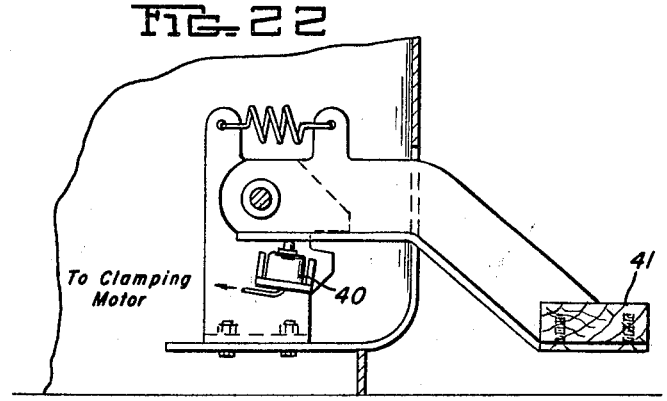

United States Patent Office 3,269,264
Patented August 30, 1966

3,269,264
APPARATUS FOR EXHIBITING COUPLING-
THREAD CONTOUR
George G. Cocks, Worthington, Ohio, assignor, by mesne
assignments, to United States Steel Corporation, Pittsburgh, Pa., a corporation of Delaware
Filed May 28, 1964, Ser. No. 370,998
17 Claims. (Cl. 88—24)

This invention relates to optical apparatus for exhibiting the contours of coupling threads on an enlarged scale for inspection.

The inspection of the threads of a pipe coupling has been attended with considerable difficulty in obtaining accurate results. Cutting a section from a coupling or making a sulphur cast of the threads has obvious limitations. Inspection of threads has been effected optically in various ways by what might be termed shadow projection. In one method, a beam of parallel light is directed at an angle to the axis of the thread equal to the pitch angle so that a shadow of the thread is thrown on a screen by means of a projection lens. In another method, a beam of light bounded on one side by a plane, for example, a knife edge, is directed on a thread. The diffused light from the thread surface is used for the optical projection of an image of the profile of the section in which the thread is cut by the bounding plane. For relatively-complicated thread forms, major limitations to these methods are interference with the beam of light and, more importantly, difficulty in delineating the boundary between shadow and light. In the latter instance, the resulting fuzziness makes precise measurements difficult or impossible, especially with inherent or necessary distortion in the optical system.

The present invention has for its principal object the provision of improved optical apparatus to exhibit on an enlarged scale for inspection, the contour of manufactured articles, particularly coupling threads.

A further object is to provide an internal thread comparator including means to focus on a thread contour a real image of a hairline, with the surrounding area illuminated. Means are also provided whereby the thread profile produced by the image is then reflected in a direction normal thereto. The reflected profile image is then magnified by other means and projected onto a screen for viewing.

The foregoing and other features of my invention will be better understood from the following detailed description and drawings in which:

FIGURE 1 is a schematic representation of the apparatus, showing an illuminated hairline image projected onto a coupling thread along an illumination axis, and an image of a thread profile produced by the hairline image on a thread, projected on a screen;

FIGURE 1a is a section taken on line 1a—1a of FIGURE 1 showing a hairline mounted in a reticle;

FIGURE 2 is a front elevation of the housing for the apparatus.

FIGURE 3 is a side elevation of the housing for the apparatus;

FIGURE 6 is an enlarged plan view of the base plate, showing the optical head in cross section and the related apparatus in dotted lines;

FIGURE 7 is an elevation of the optical head taken on line VII—VII of FIGURE 4, showing a window to view the coupling thread, a coupling ridge and a size-change plate projected to engage a coupling;

FIGURE 8 is a vertical section of the optical head taken on line VIII—VIII of FIGURE 6, showing an inlet tube, outlet tube and related mirrors;

FIGURE 9 is a vertical section taken on line IX—IX of FIGURE 6, showing mirrors for projecting the thread profile image from the optical head;

FIGURE 10 is a cross section taken on line X—X of FIGURE 7, showing the inlet tube, outlet tube, size-change plate and rack;

FIGURE 11 is a cross section taken on line XI—XI of FIGURE 8, showing the mirrors, inlet and outlet tubes and the optical-head window, all in dotted lines;

FIGURE 12 is a cross section taken on line XII—XII of FIGURE 8, showing the mirrors from below;

FIGURE 13 is a vertical section taken on line XIII—XIII of FIGURE 14, showing the optical head and the mirrors for reflecting the illumination axis into the inlet tube;

FIGURE 14 is a cross section taken on line XIV—XIV of FIGURE 13, showing the optical head in cross section and an adapted for the mirrors mounted on the underside of the base plate;

FIGURE 15 is an enlarged side view of a motor, cams and switches for operating a clamping means;

FIGURE 16 is a front elevation taken on line XVI—XVI of FIGURE 15, showing the clamping means and associated appartus;

FIGURE 17 is a vertical secton taken on line XVII—XVII of FIGURE 6, showing the optical head and the coupling size-change means;

FIGURE 18 is a vertical section taken on line XVIII—XVIII of FIGURE 17, showing the coupling size-change mechanism and an indicator therefor;

FIGURE 19 is a vertical section taken on line XIX—XIX of FIGURE 6, showing the light source, condensing lens, hairline reticle mirrors and the optical head;

FIGURE 20 is a cross section taken on line XX—XX of FIGURE 19, showing an enlarged view of the hairline reticle;

FIGURE 21 is an enlarged front elevation of a foot treadle to operate the clamping means; and FIGURE 22 is a vertical section taken on line XXII—XXII of FIGURE 21, showing the foot treadle and a two-way switch and lead therefrom to the clamping means motor.

Figure 4:
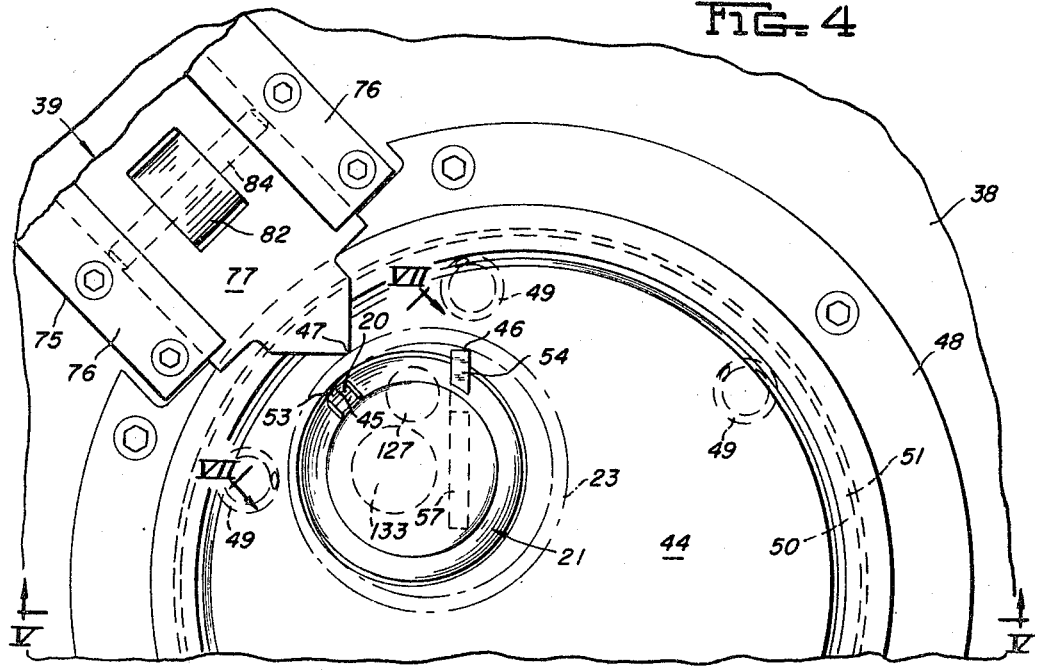
FIGURE 4 is a section taken on the line IV—IV of FIGURE 3, showing a plan view of the base plate with a coupling in chain lines positioned over an optical head.

As shown in the schematic representation of FIGURE 1, an optical comparator for a coupling thread comprises an illumination system arranged on an optical axis 10 and a projection system arranged on an optical axis 11. In the illumination system, a condenser lens 12 focuses an intense light from a light source 13 on a crosswire or hairline 14 mounted in a reticle 15, whereby the space adjacent the hairline is brightly illuminated. An optical system projects an image of the illuminated hairline onto the thread. Because of space limitations and to avoid obstructions, the optical system includes a mirror 16 to reflect an image of the hairline horizontally and at a right angle along axis 10. A second mirror 17 reflects the image vertically. A lens 18 projects the hairline image to an inclined mirror 19, which in turn reflects it horizontally and projects it through a window 20 in an optical or inspection head 21 onto a thread 22 of a coupling 23, as a vertical hairline image 24. The focal points of lens 18 are on the illuminated hairline 14 and on the image 24, respectively.

A vertical mirror 25 reflects an image of the thread profile produced by the hairline image onto an inclined mirror 26 which reflects it vertically downwardly. Because of space limitations, it is preferred to use a lens 27 to transfer an unmagnified thread-profile image to lenses 28, 29. Lenses 28, 29 then magnify and project an image 30, by means of mirrors 32 and 33, onto a transparent screen 31 where it may be viewed and gaged. The focal points of lens 27 are on the image 24 and on a point intermediate lens 27 and lens system 28, 29. One focal point of lens system 28, 29 coincides with the described intermediate point. The other focal point is on the thread profile image 30.

As explained above, an image of a brightly illuminated hairline is thus focused on a thread. Then an image of a blackline profile of the thread contour, produced by the hairline image, is projected on a screen for viewing. The vertical image of the hairline, projected along axis 10, and the vertical image of the thread profile produced by the hairline image are coincident at the thread pitch line. This pitch line is equidistant between the thread crests and roots. It is preferred that axes 10 and 11 be at a right angle to each other and that each be at an angle of 45° to a tangent to the thread at the pitch line and to a line passing through the coupling axis and perpendicular to the tangent. Immediately adjacent this intersection point, the path of the image of the hairline along axis 10 may be conceived as generating a vertical optical cutting plane intersecting the thread.

This vertical-plane concept may be applied similarly to the path of the thread-profile image along axis 11; also to the path along the line perpendicular to the tangent. The latter plane would cut a perfect or normal thread profile. This normal profile can only be observed from a direction perpendicular to this plane which is impossible, without physically cutting a coupling in half. Hence, the above-described arrangement is preferred, although the thread profile produced by an optical cutting plane is not a normal profile but one wherein dimensions perpendicular to the coupling axis are multipled by square root of two.

More particularly, thread dimensions parallel to the pitch line, such as the pitch, are unaltered. Dimensions taken perpendicular thereto, such as the thread depth, are multiplied by the square root of two, namely, the cosecant of a 45° angle. While the hairline image may be focused on the thread at other angles thereto and the profile observed from a direction at a right angle or other angle thereto, it would complicate the calculations for and construction of thread-profile templates. Such transparent templates are representative of a perfect thread. However, as explained above, although an actual thread is perfect, an exact profile thereof as marked on a template must be calculated in view of the optical system employed. A template is placed on screen 31 to permit observation of and comparison with image 30. Hence, if the above-described dimensions of the image varied irregularly, it would make the detection of thread defects more difficult.

In FIGURES 2 and 3, there is shown a housing 34 which encloses and mounts the comparator components. A frame 35 thereon mounts a transparent screen 31 on which thread image 30 is projected. Spaced clips 36 on frame 35 support thereon a template (not shown) to gage image 30. An instrument panel 37 mounts controls to operate the apparatus. A base plate 38 supports an optical head 21 and clamping means 39, the latter controlled by a two-way switch 40 operated by a treadle 41. The first profile projection mirror 32 is preferably a prime-surface mirror coated on plate Pyrex glass and clamped onto a bracket-type mount 42, adjustable and slidable in spaced vertical brackets 43, mounted on housing 34. A secondary profile projection mirror 33 is similar to but larger than mirror 32 and is similarly mounted.

Figure 5:
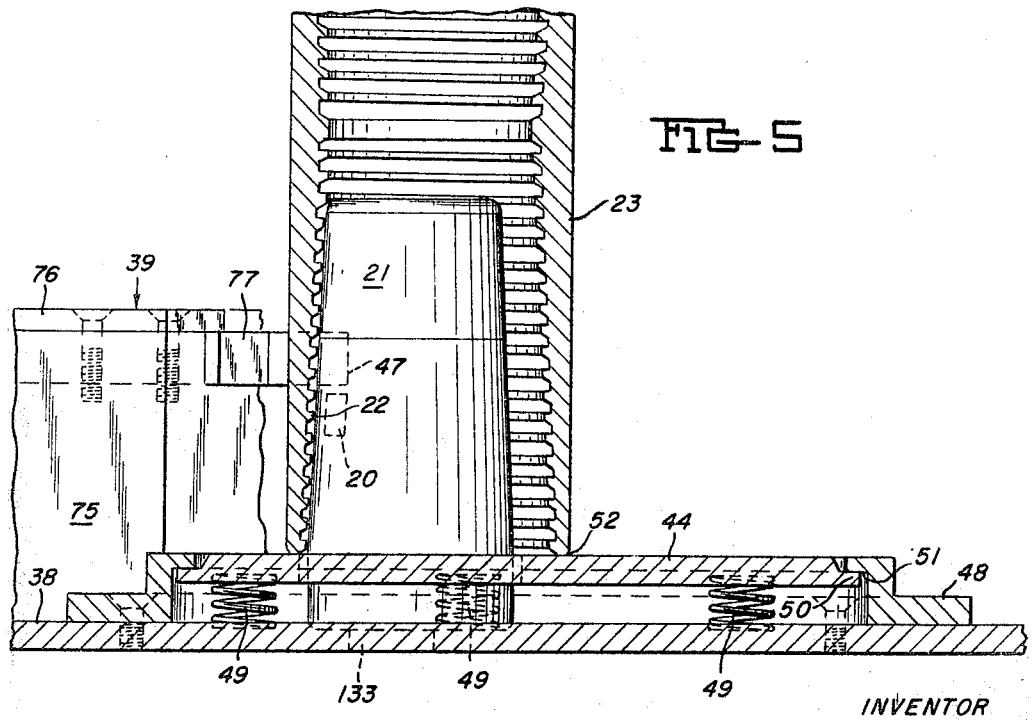
FIGURE 5 is a vertical section taken on the line V—V of FIGURE 4, showing the optical head, a floating coupling-support plate and a coupling thereon.

As shown in FIGURES 4 and 5, a coupling 23 placed over optical head 21 is supported on a floating table 44 and held in a fixed position at three spaced-apart points 45, 46 and 47. Floating table 44 is preferably a circular plate positioned in an annular ring 48, which is bolted to base plate 38. Springs 49 supported on plate 38 urge a lip 50 of table 44 against a shoulder 51 of ring 48. Floating table 44 provides the movement necessary to allow the coupling to assume the correct position during clamping. It also permits compensation for any irregularities in the end face 52 of coupling 23 when the latter is clamped. The tread 22 of coupling 23, which is cut in the surface of a cone, is first aligned by contact with an elongated, guide ridge 53 (FIGURE 7) mounted on optical head 21. Thread 22 and guide ridge 53 have the same taper. This contact represents the first support point 45. The window 20 is cut through the optical head and guide ridge.

As shown in FIGURES 4, 6, 17 and 18, the second contact point 46 with a coupling 23 is provided by a size-change plate 54, more particularly by a projecting surface 55 thereon. Plate 54 is part of a size-change mechanism whereby any coupling in a size range may be accurately positioned with respect to the optical system to permit a thread image 30 to be projected on screen 31. Plate 54 is adapted to reciprocate horizontally within optical head 21, bolted to plate 38, to position a coupling at contact points 45 and 46. Plate 54 is interlocked by a tongue-and-groove joint 56 with a rack 57, vertically reciprocable in optical head 21. Sliding in ways 58, rack 57 is reciprocated by a motor 59 through a linkage comprising a cam 60, a link 61 and a gear 62, meshing with the teeth on rack 57. As a safety means, a snapswitch 63 in the electrical circuit (not shown) to motor 59 interrupts the circuit when a roller 64 on a spring-biased arm 65 of switch 63 enters a notch 66 on cam 60. This safety means prevents over-riding of rack 57 in either direction.

Cam 60 is mounted on shaft 68 of motor 59. Another gear 69, meshing with gear 62, is keyed to a shaft 70. This shaft is journaled at its opposite extremity in a bracket 71, suspended from base plate 38.

As a size-change indicator, there is mounted on shaft 70 a disc 72 having indicia 73 thereon, calibrated to each size coupling in a range. A proper setting of size-change plate 54 for a particular coupling may be observed through a window 74 in base plate 38.

A coupling 23, after having been positioned precisely against a fixed contact point 45 and a variable contact point 46, depending on its size, is then clamped in this precise position at contact point 47 by reciprocable clamping means 39. As shown in FIGURES 4, 6, 15 and 16, a shuttle block 75 mounted on plate 38 has ways 76 thereon to slidingly confine a reciprocable clamping shuttle 77, adapted to clamp and unclamp a coupling 23. A motor 78 has mounted on its shaft 79 a cam 80 and a second cam 81. A lever 82 pivoted on a pin 83 journaled in block 75 is pivoted at its upper extremity to shuttle 77 by a pin 84. A roller 85 is journaled at the lower extremity of lever 82. A spring 86 attached to lever 82 urges shuttle 77 into clamping engagement with a coupling 23.

Shuttle 77 is shown in FIGURE 16 in its extreme position to clamp the smallest coupling in a size range. In this position, roller 85 rests in a notch 87 in cam 80. A spring-biased roller 88 on a two-way switch 89 also rests in a notch 90 in cam 81. This is the "off" position for switch 89 and for the "clamping" electrical circuit (not shown) which includes motor 78, switch 89 and two-way switch 40, operated by foot treadle 41. When treadle 41 is again depressed and then released to operate switch 40, it will energize the "unclamping" electrical circuit (not shown). This circuit includes motor 78, switch 40 and a two-way switch 91, mounting a spring-biased roller 92. Motor shaft 79 and the cams will rotate in a clockwise direction. After a quarter turn (90°), roller 85 on lever 82 will be resting on the "high" side of cam 80 and the clamping shuttle will be completely rectracted. The circuit and switch 91 will be "off" since roller 92 will rest in notch 90 of cam 81. When treadle 41 is again depressed, it will again energize the "clamping" circuit. Although shuttle 77 may clamp a large coupling rather quickly, the circuit will be energized until motor shaft 79 and the cams make a three-quarter turn (270°) to return them to the position shown in FIGURE 16.

As shown in FIGURE 19, an illumination means 13 is mounted on a housing 93, suspended from base plate 38. Means 13 is preferably a mercury-arc lamp of high intensity, commercially available with the usual auxiliary equipment (not shown). Lamp 13 is mounted vertically in electrodes 94, 95 on an insulating panel 96, adjustable in three directions to position the lamp on the optical axis 10. Housing 93 supports a plate 96', which in turn supports a threaded block 97, ways 98 and a plate 99 slidable therein. A thrust block 100 is mounted on plate 99. A handwheel 101 on instrument panel 37 is attached to and rotates a flexible cable 102, attached to and rotating a threaded rod 103 for advancing and retracting thrust block 100. As shown in FIGURE 19, this action would reciprocate slidable plate 99 and thus lamp 13 from left to right.

In a manner similar to that described, a slidable plate 104 is mounted on plate 99 for reciprocation substantially perpendicular to the plate of FIGURE 19. This is effected by means of a handwheel 105 on instrument panel 37, rotating a flexible cable 106. Similarly, insulating panel 96 is reciprocated vertically on spaced plates 107, mounted on slidable plate 104, by means of a handwheel 108 on panel 37, rotating a flexible cable 109. Lamp 13 may be replaced through an opening 110 in base plate 38 after removing a cover plate 111, which has a window 112 therein.

As shown in FIGURE 19, a sleeve 113 is mounted in housing 93. Telescoping sleeves 114, 115 and 116 are appropriately mounted within sleeve 113. At one end of sleeve 114 an adapter 117 mounts a condenser 12, preferably a double convex, aspheric condenser lens, with a 15 mm. focal length and a 35 mm. diameter. Three equally-spaced setscrews 118 (one shown) permit adjustment of the axis of condenser 12 to coincide with optical axis 10. Setscrews 119 permits condenser 12 to be moved along its axis. At one end of sleeve 116, a reticle 15 is mounted with three equally-spaced setscrews 120 to permit the adjustment of the axis of hairline 14 to lie horizontally on and normal to optical axis 10. Hairline 14 is preferably a quartz fiber cemented to reticle 15, having a diameter of about 35 microns (.0014 inch). The fiber diameter may be larger with rougher thread surfaces and smaller with smoother surfaces. Opening 121 in reticle 15 permits the light from lamp 13 focused by condenser 12 to surround hairline 14.

As shown in FIGURES 6, 13, 14, and 19, mirrors 16 and 17 are mounted in a block 122, suspended from base plate 38. Mirrors 16 and 17 are preferably prime-surface mirrors coated on truncated quartz cylinders. A number of passages are drilled through block 122, the centerlines thereof coinciding with optical axis 10. A horizontal passage 123, drilled on the same centerline, houses mirror 16 and a passage 124 accommodates sleeve 116, mounting reticle 15 therein. A lateral passage 125 is on the optical axis between mirrors 16 and 17. A vertical passage 126 houses mirror 17 and has the same centerline (optical axis 10) as a vertical passage 127 in optical head 21. A tube 128, threaded into the lower end of passage 127, has threaded therein an adapter 129, housing hairline-projection lens 18. Lens 18 preferably has a 40 mm. focal length and a 12 mm. diameter.

As shown in FIGURES 7-14, optical head 21 is in the form of a truncated cone and comprises a base portion 130, a top portion 131 and a cover 132. The separate but coextensive portions of guide ridge 53 meet along a line 53a. Base 130, mounted on plate 38, has, in addition to vertical passage 127, a vertical passage 133, the centerline thereof being coincident with projection optical axis 11. In an upper threaded portion of passage 133 an adapter 134 supports transfer lens 27, preferably a one-inch focal length, f/1.9 objective lens. A tube 135, threaded into the lower portion of passage 133, has threaded therein an adapter 136 housing magnifying projection-lens system 28, 29, preferably of 26 mm. focal length, for example, an f/2.0 Kodak Ektar projection lens.

Whereas mirrors 19, 25 and 26 are positioned in an upper recessed portion of base 130, they are suspended from top portion 131. All three mirrors are proferably prime-surface mirrors comprising coated, optically flat glass plates cemented on shaped steel blocks for mounting on top portion 131. It is preferred to shape each steel block to mount its mirror in approximately the required position on the appropriate optical axis. The inclined, hairline image projection mirror 19 is mounted on top portion 131 by a cap screw 137. Mirror 19 may be rotated about the axis of screw 137. Three setscrews 138 in top 131 bear against the mounting to position the mirror at the preferred angle of inclination to cast a vertical hairline image 24 onto thread 22. The vertical primary-thread profile viewing mirror 25 is fixed in position on top portion 131 by two cap screws 139. The inclined, secondary thread-profile viewing mirror 26 is mounted on top portion 131 by a cap screw 140. Mirror 26 may be rotated about the axis of screw 140. Three setscrews 141 in top 131 bear against the mounting to position the mirror at the preferred angle of inclination. Three spaced cap screws 142 fasten top portion 131 to base portion 130. Cover 132 is attached to top 131 by a screw 143.

In addition to the apparatus described above, there is other apparatus mounted in housing 34 that is not shown. This apparatus may comprise the usual auxiliary apparatus associated with the described apparatus. Except for foot treadle 41, all of the usual controls for operating the apparatus are mounted on panel 37. Indicating means for observing the operating status of some of the apparatus are also mounted on panel 37. There is also a conditioning system to provide filtered air under pressure, thus preventing the entry of dust into the optical head and optical system.

As a specific example, the described comparator having its optical system aligned on the respective optical axes 10 and 11 was used to observe and check a buttress-type thread on a commercially-available tubing coupling. The thread is of the type cut on couplings used to couple 2" through 4½" outside-diameter tubing having eight threads per inch, the thread taper being about ¾" per foot measured on the diameter. The thread pitch on a coupling is about .1250" and the pitch line is equidistant the thread crest and root, the dimension being about .0250". A template made for this thread is placed on transparent screen 31 and held in position with clips 36. The preferred thread-profile image 30 is magnified by lens system 28, 29 about 62½ times.

In operation, the main electrical-power switch is turned on and lamp 13 is lighted. Motor 59 of the size-change mechanism is rotated in the appropriate direction until the coupling size which is to be gaged is observed on disc or drum 72 through window 74. The coupling is then placed over optical head 21 on floating table 44. While held against guide ridge 53 on the optical head 21 and against projecting surface 55 on plate 54, the coupling is rotated by hand until image 30 on screen 31 coincides with the thread form inscribed on the template. The coupling is lined up in this manner since the thread is cut on a spiral. In this position, the coupling thread crests are held against guide ridge 53 and optical axes 10 and 11 intersect outside optical head 21 at a point about .0250" from guide ridge 53, at the pitch line of the thread. Foot treadle 41 is then pressed down and released, thereby clamping the coupling in position by means of the shuttle 77. Should the coupling be skewed, it is adjusted on floating table 44 until image 30 lines up with the template.

After the thread image has been observed and compared with the template, the foot treadle 41 is pressed down and released. This operation retracts shuttle 77 and unclamps the coupling, permitting the removal thereof. A new coupling can then be mounted and gaged as described above.

From the foregoing description, it will be apparent that the present invention provides an apparatus of compact construction whereby coupling threads of various sizes may be measured rapidly to an accuracy of about ±0.0005″, with a minimum of operator fatigue. In use, it has been determined that inspection of a single thread of any coupling is sufficient for control purposes. Normal tool wear does not progress rapidly enough in cutting a single coupling to produce a thread within tolerance at one end and out of tolerance at the other end. The buttress thread of the example is cut with arcs of different radii connecting the respective thread flanks with the crest and root. Hairline 14, when surrounded by light according to the invention, is sharply defined on the thread as an image 24. The corresponding profile of the thread when viewed along the optical axis 11 perpendicular to the illumination axis 10 is also sharply defined without distortion, permitting the above-described connecting arcs, as well as the other thread components, to be compared with accuracy. The magnified thread profile also permits examination of the quality of the thread surface.

While the several figures of the drawing show and the above explanation refers to a preferred apparatus for practicing my invention, other conditions of operation and structure may be used without departing from the spirit of the invention. Couplings may vary in size, thread form, thread taper and thread size. There is obviously a limit in the size of coupling that can be accommodated in the described comparator. However, the principles of the invention may be used in designing a comparator to handle much larger couplings. The elements included in the present optical head 21 preclude the handling of couplings for pipe that is much smaller than 2″ outside diameter. However, smaller sizes may be inspected by use of smaller lenses. With a different thread form, the size-change mechanism should be adjusted so that the tangent of the coupling is at 45° to the optical axes 10 and 11. Indicator disc 72 would also be recalibrated for the particular size range of couplings. With a different thread depth, the intersection of axes 10 and 11 will not coincide with the pitch line of the thread. This difference may be taken care of in preparing a gage template for the particular thread or by adjusting the optical system to permit axes 10 and 11 to intersect at the required distance outside optical head 21. A difference in the thread taper would require a corresponding change in the slope of the guide ridge 53 on the optical head. Internal recesses, contours and other cut-out portions, if machined on manufactured articles other than couplings, may likewise be examined in accordance with the principles of my invention.

Although I have disclosed herein the preferred embodiment of my invention, I intend to cover as well any change or modification therein which may be made without departing from the spirit and scope of the invention.

I claim:

1. Optical apparatus for exhibiting a coupling-thread contour comprising a hairline reticle, means for illuminating the hairline, first optical means adapted to project a black image of said hairline with a light background onto a coupling thread and second optical means adapted to pick up and project an image of the thread profile produced by said hairline image.

2. Optical apparatus as defined in claim 1 characterized by said first optical means adapted to project an image of said hairline onto a coupling thread parallel to the coupling axis and at an angle of substantially 45° to a tangent to said thread, said second optical means adapted to pick up an image of the thread profile produced by said hairline image falling on said thread from an angle of substantially 45° to said tangent and adapted to project a magnified image of the thread profile onto a screen.

3. Optical apparatus as defined in claim 2 characterized by the point of tangency of said tangent being on the pitch line of said thread.

4. An optical comparator for exhibiting and inspecting internal coupling threads comprising a plate mounted on said comparator adapted to support an optical head and a coupling thereon, means on said head adapted to position a coupling thereover at two spaced-apart points on said thread, means adapted to clamp said coupling against said points, a hairline reticle and illumination means therefor depending from said plate, means mounted on said head adapted to project an image of said hairline onto said thread and means mounted on said head adapted to project for inspection a magnified image of the thread profile produced by the hairline image falling on said thread.

5. A comparator as defined in claim 4 characterized by an elongated ridge mounted on said optical head adapted to contact said thread and thereby to position said coupling at a said first point.

6. A comparator as defined in claim 4 characterized by a vertically reciprocable rack mounted on said head, means to reciprocate said rack, a bar mounted on said head and in engagement with said rack adapted to contact said thread and thereby to position said coupling at a said second point, spaced apart from said first point.

7. A comparator as defined in claim 4 characterized by a block mounted on said plate, a member reciprocable in said block, and means to reciprocate said member, whereby to clamp said coupling against said points.

8. A comparator as defined in claim 4 characterized by a housing enclosing said comparator, a plate mounted horizontally on said housing adapted to support an optical head thereon, a ring mounted on said plate, an annular recess on the inner, underside edge portion of said ring, spaced biasing means mounted on said plate, an annular plate mounted on said biasing means, whereby said plate is urged against said annular recess and thereby is adapted to yieldingly support thereon a coupling placed over said optical head.

9. A comparator as defined in claim 4 characterized by a housing mounted on the underside of said plate, a lamp, a source of power for said lamp, an adjustable support for said lamp mounted on said housing, a tube mounted on said housing, a condenser lens mounted at one end of said tube adjacent said lamp, a reticle adjustably mounted at the other end of said tube, a hairline mounted in said reticle, whereby when said lamp is lighted said condenser lens focuses the light from said lamp on said hairline and illuminates the area surrounding said hairline.

10. A comparator as defined in claim 4 characterized by two spaced passages being located in said head, first optical means including a lens mounted in a first passage adapted to project an image of said hairline onto said thread and second optical means including a second lens mounted in a second passage adapted to project for inspection a magnified image of the thread profile produced by the hairline image falling on said thread.

11. A comparator as defined in claim 10 characterized by a mounting means suspended from said plate, at least one mirror mounted on said means adapted to reflect an image of an illuminated hairline onto said first lens.

12. A comparator as defined in claim 10 characterized by a mirror mounted on said head adapted to reflect onto said thread an image of said hairline projected thereon by said first lens, said first lens having respective focal points on said illuminated hairline and on said thread.

13. A comparator as defined in claim 10 characterized by at least one mirror mounted in said head adapted to reflect onto said second lens an image of the thread profile produced by the hairline image falling on said thread.

14. A comparator as defined in claim 10 characterized by a housing enclosing said comparator, a transparent screen mounted on said housing, at least one mirror mounted on said housing adapted to reflect onto said screen a projection from said second lens of a magnified image of the thread profile produced by the hairline image falling on said thread, said second lens having its respective focal points on the thread profile produced by the hairline image falling on said thread and on said transparent screen.

15. A comparator as defined in claim 10 characterized by an optical head in the shape of a frustum of a cone comprising a base portion mounted on said plate and a top portion mounted on said base portion, an elongated coextensive guide ridge mounted on both the outer portions of said base portion and said top portion, the slope of said guide ridge being substantially the same as the taper of the coupling thread, whereby said guide ridge is adapted to contact said thread and thereby to position said coupling at a first point, a window opening outwardly through said top portion and said guide ridge, said two spaced passages being located in said base portion, the respective axes of said base and top portions, coupling and said passages being substantially parallel and vertical, a first mirror mounted on said top portion, adapted to reflect from said first lens an image of said hairline, whereby said image is reflected through said window onto a coupling thread parallel to the coupling axis and at an angle of substantially 45° to a tangent to said thread, a second mirror mounted on said top portion, adapted to reflect from an angle of substantially 45° to said tangent an image of the thread profile produced by said hairline image falling on said thread, and a third mirror mounted on said top portion, adapted to reflect said thread profile image to said second lens.

16. A comparator as defined in claim 15 characterized by a transfer lens mounted in said second passage and interposed between said third mirror and said second lens.

17. An optical comparator for exhibiting and inspecting the internal contours of manufactured articles comprising a plate mounted on said comparator adapted to support an optical head and a manufactured article thereon, means on said head adapted to position a said article thereover at two spaced-apart points on the internal contour thereof, means adapted to clamp said article against said points, a hairline reticle and illumination means therefor depending from said plate, means mounted on said head adapted to project an image of said hairline onto said contour and means mounted on said head adapted to project for inspection a magnified image of the contour profile produced by the hairline image falling on said contour.

References Cited by the Examiner

UNITED STATES PATENTS

| 2,196,922 | 4/1940 | Hybarger | 88—14 |
| 2,256,102 | 9/1941 | Reason | 88—24 |
| 2,327,289 | 8/1943 | Reason | 88—14 |
| 2,506,498 | 5/1950 | Fuller | 88—24 |
| 2,552,272 | 5/1951 | Fultz | 88—24 |

FOREIGN PATENTS

| 395,649 | 8/1933 | Great Britain. |

NORTON ANSHER, *Primary Examiner.*

V. A. SMITH, *Assistant Examiner.*